July 16, 1940. S. VERNET 2,208,149
CONTROL MEANS
Filed June 13, 1936 2 Sheets-Sheet 1

INVENTOR
Sergius Vernet
Andrew K. Fulda
his ATTORNEY

July 16, 1940.  S. VERNET  2,208,149
CONTROL MEANS
Filed June 13, 1936  2 Sheets-Sheet 2

INVENTOR
Sergius Vernet
BY Andrew K. Fulda
his ATTORNEY

Patented July 16, 1940

2,208,149

UNITED STATES PATENT OFFICE 2,208,149

CONTROL MEANS

Sergius Vernet, Yellow Springs, Ohio, assignor to Vernay Patents Company, Yellow Springs, Ohio, a corporation of Delaware Application June 13, 1936, Serial No. 85,141

11 Claims. (Cl. 60—54.6)

My invention relates to new and useful improvements in force transmitting means and more particularly to a device for transmitting power from a fluid pressure source or from a temperature responsive medium.

In devices or apparatus of this nature wherein a piston or a plunger is employed for transmitting force created by fluid pressure or by temperature, some means must be provided to close and seal the pressure chamber, and it is one object of my invention to provide novel means to accomplish this purpose.

Another object is to provide a temperature responsive actuating means for the piston or thrust member which will also serve as a sealing means for the chamber.

Another object is to provide a device in which the thrust member or piston may have its opposite ends extended from its pressure chamber and utilized for actuating controlling means.

The foregoing and other objects and advantages of my invention will in part be apparent and in part be particularly pointed out hereinafter wherein my invention is fully described and will be distinctly claimed.

In the accompanying drawings, to be taken as a part of this specification, I have fully and clearly illustrated certain embodiments of my invention, in which drawings—

Figure 1:
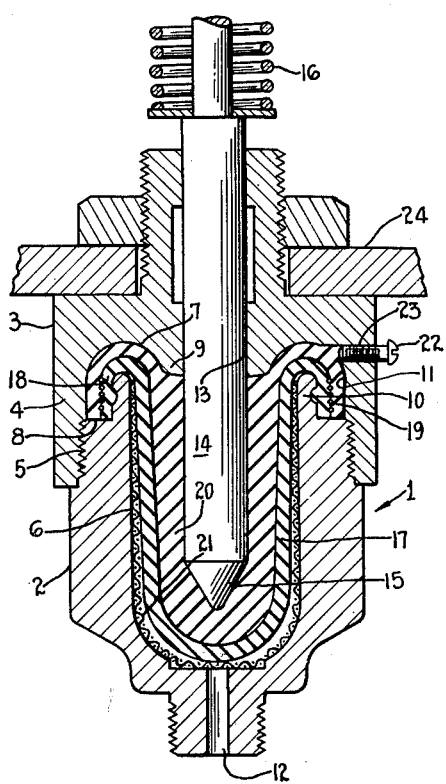
Figure 1 is a view in vertical central section of a pressure responsive force transmitting means embodying my invention.

Referring to the drawings by characters of reference and particularly to Fig. 1, the numeral 1 designates generally a casing or housing having a hollow cup-like bottom member 2 and a top closure or cover member 3 having a side wall 4 which receives and has screw-threaded engagement, as at 5, with the member 2. The members 2, 3 cooperate to provide an internal chamber 6. The inner end wall 7 of member 3 is spaced from the end wall 8 of member 2 and has a central inwardly projecting portion or extension 9. Extending from the wall 8 there is an annular flange 10 forming a continuation of the cylindrical wall of chamber 6 and terminating short of wall 7. The flange 10 is concentric with extension 9 and forms therewith and with the side wall of member 3 an annular recess 11 communicating with chamber 6. Opening through the bottom wall of member 2 and into chamber 6 there is a passageway or port 12 for the admission of fluid under pressure. The member 3 has a guide bore 13 which opens into chamber 6 and concentrically through the extension 9 and which has reciprocally guided therein with a sliding fit a piston or thrust member 14. The inner end of the piston within chamber 6 terminates in a tapered or conical end portion 15 for a purpose to be described. The outer end portion of the piston external of the casing 1 may be operatively connected to any device to be actuated and is provided with a return means 16 such as a spring or the like.

Within the chamber 6 there is a diaphragm or partition member 17 of flexible elastic resilient material such as vulcanized rubber which is of cup-shaped form preferably conforming to the wall of chamber 6 and receiving the piston 14. The upper end or marginal rim portion of member 17 is turned outward and back, as at 18, over and around the flange 10. The portion 18 is tightly secured and sealed to the outside face of flange 10 by a binding 19 comprising a plurality of turns of thread or the like. Filling the chamber 6 within member 17 and around piston 14 there is a plastic medium 20 which also fills the recess 11 and overlies the binding 19 and partition portion 18.

The plastic medium 20 is an elastic resilient material which is pliable and cohesive and which has nerve and ability to flow under pressure. The property of cohesion which is the ability of the material to reunite or re-form into an integral continuous mass when parts of the material are brought into contact with each other under pressure is a highly desirable characteristic. Nerve is the characteristic of the possession of considerable strength tending to prevent the material from deforming and also to prevent cold flow and rupture. It is also important that the material should be one which may be described as dry, that is, one which will not form a film upon or which will not wet the surface of the piston as such a film forming or wetting material would seep or leak through the piston clearance in bore 13 upon continued reciprocation of the piston. It is further desirable that the material 20 should be one which will not during continued working or kneading as the piston is operated undergo a chemical or a physical change such as depolymerization or vulcanization or have particles chafe or rub off as such a breaking down of or change in the material would result in leakage of the material through the bore 13 around piston 14. Certain materials which have the foregoing desirable qualities and characteristics and which I have found to be satisfactory are pale crude rubber, pure crepe rubber and rubber gum as well as certain prepared materials such as unvulcanized Duprene. The material or medium 20 is preferably mixed with a lubricant such for example as glycerin or triethanolamine or a mixture of these lubricants. The lubricant may be mixed with the medium 20 before it is placed in chamber 6 or the piston and plastic may be coated with the lubricant before assembly. In the latter case, the lubricant quickly mixes in operation with the plastic medium due to the kneading action of the piston.

Surrounding the diaphragm member 17 and preferably substantially conforming to the wall of chamber 6 there is a reticulated cup-like member 21 preferably of wire gauze which spaces the member 17 from the chamber wall and from the port 12 so as to permit free fluid flow into and from the chamber. The volumetric capacity of the chamber 6 is also preferably regulatable and particularly that part which contains the medium 20. This may be accomplished by means of a screw plunger 22 adjustably screw-threaded in an aperture 23 through the wall of member 3 so that the initial position or the position of the piston 14 for any given fluid pressure can be controlled. A supporting means 24 for the device and secured to member 3 is also preferably provided.

The operation of the above device is as follows: When fluid under pressure is admitted to chamber 6 through port 12, the fluid will act equally on the sides and the bottom of member 17 thereby squeezing laterally inward as well as pushing upward. The lateral pressure will be resolved into an upward force component due to the tapered piston portion 15 and together with the direct pressure against the piston end, will move the piston upward or outward against the resistance of spring 16. The pressure exerted on the medium 20 will be transmitted thereby to the walls of recess 11 and will act on the diaphragm portion 18 urging the same against flange 10. The pressure exerted by the plastic medium in recess 11 will not of course be exactly equal to or balance the pressure of the fluid against member 17, but this unbalance is made up effectively by the binding 19 which need exert only a relatively small constant pressure to positively seal the joint and prevent leakage between member 17 and flange 10. The extension 9 serves to maintain the medium 20 immobile within recess 11 during operation of the piston and particularly when the piston reaches the upper end of its stroke in order to prevent decrease of pressure in recess 11 and movement of the medium in the recess which would result in rupture of the seal. The recess 11 also provides a region or space for the seal which is thus removed from the vicinity of motion of the plastic material during reciprocation of the piston so that the movement of the material by the piston does not offset the seal. Due to the characteristics of the medium 20 above described, it will have substantially no penetration into bore 13 and will not be separated from the main body. The lubricant of course aids in preventing the dragging of the medium 20 by friction into the bore. When the fluid pressure acting on member 17 through port 12 is relieved, the spring 16 acts to return the piston toward and ultimately to its position in Fig. 1. As the piston moves down or inward, the friction on the medium 20 will, if there has been any penetration, withdraw the medium from the bore, the quantity of lubricant being insufficient to prevent this action.

Figure 2:
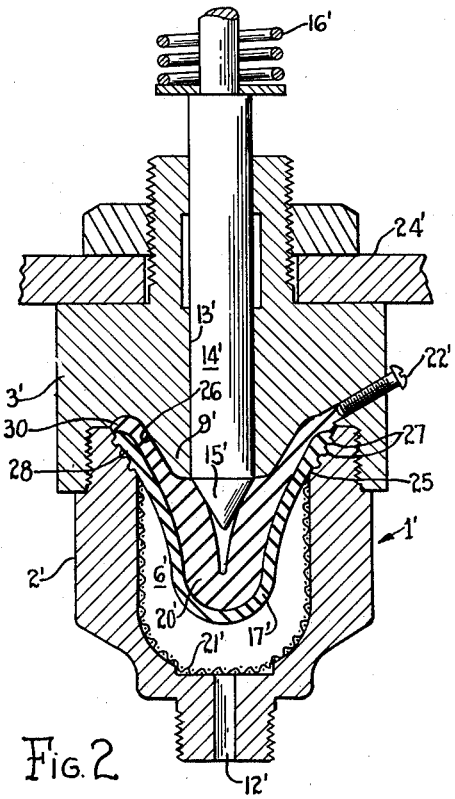
Fig. 2 is a view in vertical central section of a modification of the device of Fig. 1.
Figure 3:
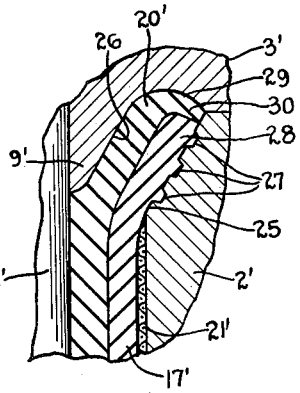
Fig. 3 is an enlarged detail view in section of a part of the device of Fig. 2 but showing the piston member in its down or inner position.

In Figs. 2 and 3 there is shown a modification of the device of Fig. 1 and which differs therefrom only in respect to the sealing of the diaphragm member and therefore the primes of the reference characters applied to Fig. 1 designate like parts in Figs. 2 and 3. In this form, the upper end or rim portion of member 2' is internally flared, as at 25, to provide with the extension 9' a conical channel or recess 26. The flared portion 25 is provided with a series of continuous parallel grooves 27. The upper end portion 28 of member 17' extends into channel 26 but terminates short of the end or bottom wall 29 thereof so that the plastic medium 20' which is preferably lubricated, extends between the end wall 29 and the diaphragm end portion 28, as at 30. The portion 28 is vulcanized to the flared wall 25 and is interlocked in the grooves 27 so that a tight sealed joint is provided. The operation of this form, in which the piston 14 is shown in its raised or outward moved position, is the same as above described with respect to Fig. 1. The strength of the vulcanized bond between the diaphragm portion 28 and the wall 25 is greater than the difference between the pressure of the fluid acting on member 17' and the pressure of medium 20' acting to hold portion 28 against wall 25 so that leakage of the pressure fluid is prevented. Here also as in Fig. 1, it will be noted that the recess 26 provides a region or area removed from the vicinity of motion of the plastic material, thereby to enhance the effectiveness of the seal.

Figure 9:
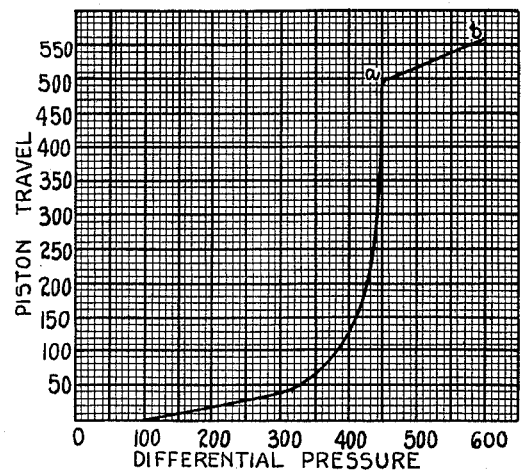
Fig. 9 is a graph of certain characteristics of the devices of Figs. 1 and 2.

The chart, Fig. 9, shows the movement of the piston in thousandths of an inch with respect to the effective fluid pressure in pounds per square inch acting on the diaphragm member 17 or 17'. It will be noted that within the working range of the piston, say from a differential of four hundred pounds to four hundred fifty pounds per square inch, the efficiency is of a very high degree. The upper pressure limit designated by point $a$ indicates the piston position as in Fig. 2 when the tapered portion has reached the guide bore. Continued outward movement of the piston wherein its end portion enters the guide bore results in inefficient operation as indicated by the curve $a\ b$. In addition to the marked decrease in efficiency, the forcing of the plastic medium into the guide bore results in a mastication and kneading of the same which is deleterious to continued efficient operation as it tends to cause a breaking down of the plastic medium structure. The operation of the piston is therefore preferably limited in its outward stroke to the position of Fig. 2.

Figure 4:
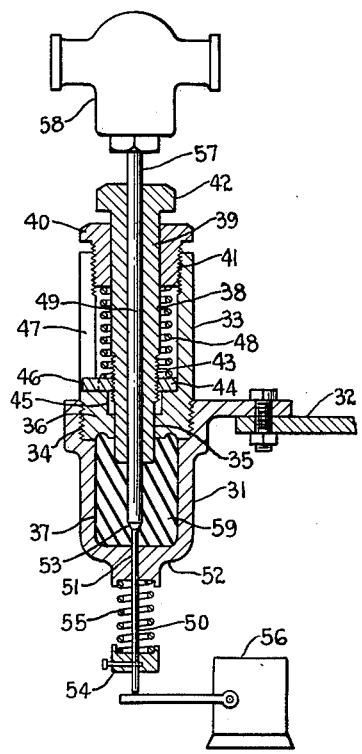
Fig. 4 is a view in vertical central section of a temperature responsive device also embodying my invention.

Referring now to Fig. 4, the numeral 31 designates a cup-shaped casing or container having a supporting member 32 and having a closure member 33 preferably tightly screw-threaded, as at 34, into member or casing 31. The member 33 is tubular having an aperture 35 opening through its end closure wall 36 into the casing chamber 37. Guided in the bore of aperture 35 there is an adjustable pressure responsive sleeve member 38 which extends at its lower or inner end into the chamber 37. The outer end portion 39 of member 38 extends beyond the end of closure member 33 and through a sleeve nut 40 in which it is guided and which is adjustably screw-threaded, as at 41, in member 33. The outer sleeve end 39 is preferably provided with a head 42 by which it may be rotated for adjustment. The sleeve member 38 is screw-threaded, as at 43, intermediate its ends to adjustably receive a stop collar or member 44 which seats on the end wall 36 within the bore of member 33. The wall 36 is provided with a recess 45 to receive the threaded portion 43 for free reciprocation. The collar 44 has a lug or finger 46 which extends into a slot 47 open at its outer or upper end and in the side wall of member 33 to hold the collar against rotation while permitting longitudinal movement of sleeve member 38. The collar 44 is held against wall 36 by a spring 48 which surrounds member 38 and is held under compression by the nut 40. The force of spring 48 opposing outward movement of sleeve member 38 is adjustable by rotation of nut 40. Reciprocal in the bore of sleeve member 38 and slidably fitting the same, there is a piston or thrust member 49 which extends into and through the chamber 37. The member 49 is preferably a rod of two diameters, it being reduced within the chamber 37 to provide an end portion 50 of smaller transverse cross-section or area which extends through and is slidably fitted in a guide aperture 51 through the chamber end wall 52. The point of union 53 between the rod portions of different diameter provides a pressure surface for transmission of force to the rod 49 and is preferably of tapered or conical form so that a component of lateral pressure will act to move the rod. On the external end of rod portion 50 is secured a stop or abutment member 54 between which and the casing wall 52 there is a coil spring 55 acting to move the rod in one direction and opposing movement of the rod by pressure on the piston face 53. The rod end 50 operatively engages a control means 56 such as a switch for example, whereas the other rod end portion 57 may be connected to a second control means 58 such as a valve for example. The chamber 37 is filled with a plastic material or medium 59 preferably the material 20 above described which is expansible and contractible in accordance with increasing and decreasing temperature change.

In the operation of the device of Fig. 4, as the temperature to which the material 59 is subjected increases, the material will expand and acting on the piston face 53 will move the rod upward and actuate the control means 56 and the control means 58. The movement of the piston rod will be opposed by spring 55 and when the rod reaches its limit of travel or is held for any reason against movement, then continued expansion of material 59 acting against sleeve member 38 will overcome spring 48 and move sleeve member 38 outward to increase the volumetric capacity of the chamber. By moving the sleeve member inward or outward with respect to collar 44, the capacity of chamber 37 can be regulated and also the position of the piston 49 for any given temperature. Adjustment of nut 40 will determine the force in opposition to movement of piston 49 which will prevent movement thereof. Thus the force of spring 55 will set the limit of movement of rod 49. In this form it is not necessary to provide a separate packing or sealing means for the guide bores of rod 49 or of sleeve member 38 from chamber 37 since the material 59 due to its above described characteristics effectively seals the bores around the rod and the sleeve member. In addition, the efficiency of operation of this form is increased by the two-diameter piston or rod since it is not necessary for the plastic medium to close in completely as the piston moves, but only to the diameter of the rod portion 50 which eliminates the pressure loss in overcoming the resistance of the material 59 to complete closure of the opening which would be left if the rod portion 50 were not employed.

Figure 5:
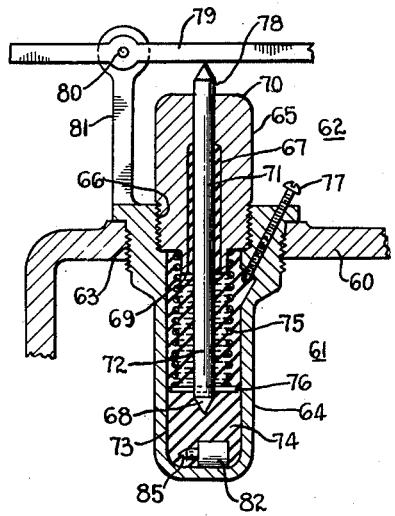
Fig. 5 is a view in vertical central section of another form of temperature responsive device.
Figure 8:
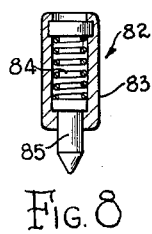
Fig. 8 is a detail view in section of an element which may be utilized in the devices of Figs. 5, 6 and 7.

The device of Fig. 5 is also temperature responsive and is particularly adapted for use in connection with heating apparatus or for high temperature application which except for this construction might impair the effectiveness of the plastic material or medium as a piston seal. The numeral 60 designates a wall of a boiler or the like for example which separates a region 61 of high temperature from a cooler area 62 or region of relatively lower temperature. Through the wall 60 there is an aperture 63 which is closed by a hollow casing or container 64 of elongated tubular form which extends into the high temperature area 61 and which has its open outer end directed toward the cooler area 62. The open casing end is tightly closed by an elongated cap member 65 screw-threaded thereinto as at 66. The member 65 is hollow having a longitudinal recess 67 which opens at its inner end concentrically into the casing chamber 68 where it is provided with an annular flange 69. Through the end wall of cap member 65 which is in spaced relation to wall 60 there is an aperture 70 concentric with and opening into the outer end of recess 67. Slidably fitted in the bore of aperture 70 for reciprocal guided movement there is a thrust member or piston 71 comprising a rod which is spaced circumferentially from the side walls of recess 67 and which extends at its inner end 72 into chamber 68. The inner end of rod 71 terminates in a conical or tapered portion 73 defining a pressure face. The chamber 68 and the recess 67 are filled with a plastic material or medium 74 such as the material 59 above described. Within the chamber 68 there is a return spring 75 embedded in the material 74 and having one end encompassing and held by the flange 69 and having its other end seating on an abutment member 76 such as a cross pin secured to and through the rod end 72. The volumetric capacity of chamber 68 may be regulated by the adjustment screw 77 to control the initial position of the piston rod or its position for any given temperature. The outer or external piston rod end 78 is operatively connected to a control means 79 such as a damper lever which may be pivotally supported as at 80 on a support 81 carried by casing 64. Within the chamber 68 and embedded in the material 74 there is a safety member 82 to permit continued expansion of the material 74 when the piston movement is stopped for any cause. The member 82 is shown in detail in Fig. 8 and comprises a hollow shell or casing 83 containing a spring 84 which resists inward movement of a piston 85 guided in and projecting from the casing 83. The force exerted by spring 84 in opposition to movement of piston 85 is greater than the resistance of spring 75. The relatively thin annular wall of plastic material surrounding the piston 71 within recess 67 is cooled by the air or other medium surrounding the cap member 65 and so is maintained in proper condition to effectively seal the aperture 70 around piston 71. The operation of this form of temperature responsive device will be apparent from the foregoing description.

Figure 6:
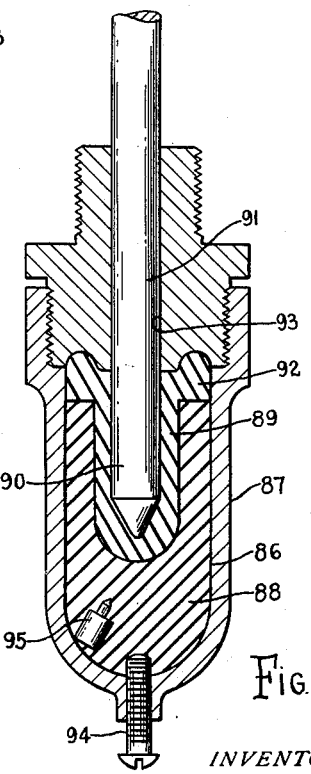
Fig. 6 is a view in vertical central section of a further modification of the temperature responsive device.

In Fig. 6, the chamber 86 of the casing 87 contains a relatively soft plastic material or medium 88 which will flow readily and which is responsive to temperature, expanding and contracting in accordance with temperature change. This material 88 is sealed in chamber 86 by the plastic material or medium 89 having the qualities and characteristics of the material 20 above described. The material 89 envelopes the inner tapered end portion 90 of the piston 91 and preferably fills the upper end portion of chamber 86 to form a seal, as at 92, around the chamber end of piston guide bore 93. The material 89 thus serves as an expansible-contractible casing for transmitting the expansive force of the material 88 to the piston 91 while preventing leakage of the material 88 from the chamber. An adjustment member 94 is provided for regulating the volumetric capacity of the chamber. A safety expansion means 95 for automatically increasing the volumetric capacity of the chamber is also provided, this means being similar to the member 82 of Figs. 5 and 8.

Figure 7:
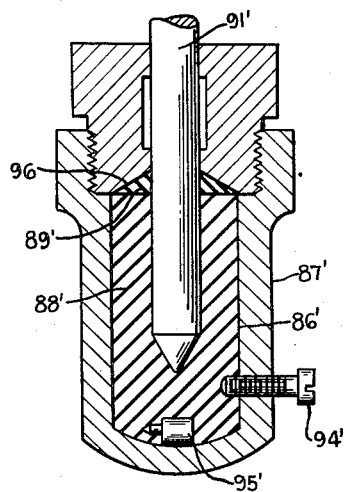
Fig. 7 is a view in vertical central section of still another form of temperature responsive device.

The device of Fig. 7 is substantially the same as that of Fig. 6 and therefore the primes of the reference characters applied thereto designate like parts in Fig. 7. In this form, the relatively soft plastic material 88' acts directly upon the piston and the material 89' serves solely as a packing or sealing means which surrounds the piston at its guide bore. The seal is made effective in this form by providing a conical end wall 96 for the chamber 86' and against which the material 89' seats so that the pressure of the material 88' thereagainst serves to force the material 89' laterally inward against the piston and thus prevents leakage of the material 88'.

It is preferable that lubricant be employed with the plastic material in each of the foregoing devices in the same manner as has been described in connection with Fig. 1 so that excessive surface mastication will not occur as the piston reciprocates, but the lubricant should also not excessively reduce the friction of the piston. An excessive reduction in the friction would eliminate the activity of the piston in removing material which might enter the bore on the outward stroke of the piston.

Figure 10:
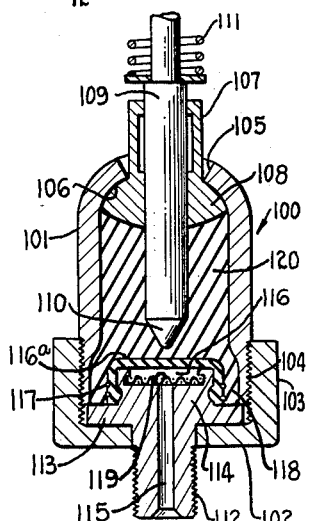
Fig. 10 is a view in longitudinal central section of another form of my invention embodied in a pressure responsive force transmitting means.

Referring to Fig. 10, the numeral 100 designates a casing or container comprising a cup-like body member 101 and a cap or cover member 102 having a marginal flange 103 which is internally threaded for screw-threaded engagement as at 104 with the member 101. The end wall of member 101 has an aperture 105 therethrough and is preferably of substantially hemispherical internal contour, as at 106, surrounding the aperture. Extending through the aperture there is a bushing or guide sleeve 107, preferably of bronze, having a lateral surrounding flange 108 conforming to surface 106 and fitting against the same. The sleeve 107 fits loosely in aperture 105 so that it is universally adjustable. Reciprocally guided in the bore of sleeve 107 with a close free sliding fit there is a piston or thrust member 109 which terminates within the casing in a conical or tapered end portion 110. The outer or external end may be operatively connected to a device to be controlled and is preferably acted upon by a return means 111 such as a spring which opposes outward movement of the piston. An end closure member or inlet fitting 112 preferably separate from the cover member 102 has a flange 113 which fits against the inside face of the member 102 and is clamped tightly thereby against the end face of the rim or wall of member 101. The fitting 112 has a cylindrical internal projecting portion 114 and also a nipple portion which extends through an aperture in the cover member 102 and which is externally screw-threaded for connection to a pressure conduit or pipe line. Longitudinally through the fitting, there is a bore or passageway 115 which communicates at its inner end with and opens into a fluid pressure chamber 116. This chamber is formed by a resilient diaphragm or flexible partition member 116ᵃ preferably of vulcanized rubber or the like which separates the interior of the casing 100 into two compartments. The diaphragm member 116ᵃ is of cup-like form and fits over the extension 114, being tightly secured and sealed to the circumferential wall of the extension by a binding 117 of thread or by vulcanizing as described in connection with Fig. 2. Between the side wall of diaphragm member 116ᵃ and the body member 101 there is an annular recess 118 so that pressure can be exerted against the side wall of the diaphragm member to press it against the extension. A screen member 119 is preferably secured to the fitting in overlying relation to the bore 115 to hold the diaphragm member from entrance thereinto. The chamber which receives piston 109 is filled as is recess 118 with plastic material 120 such as the material 20 above described, this material also being lubricated as above described.

In operation of the device of Fig. 10, when fluid under pressure enters chamber 116 through bore 115, the diaphragm member 116ᵃ will transmit the pressure of the fluid to the material 120 which will act on the piston 109 as above described in connection with Fig. 1 to move the piston outward against the force of spring 111. The pressure exerted by the diaphragm on the material 120 will be transmitted to that part of the material in recess 118 and act to hold and urge the diaphragm in tight sealing engagement with extension 114 in the same manner as above described with respect to Fig. 1. The outward movement of the piston may tend to carry a minute part or ring of the material into the bore of the sleeve 107, but due to the characteristics of the material 120 that part will not separate from the main body and on the return or inward stroke of the piston will be, by the friction of the piston, carried out of the bore and be reformed with the main mass. The reciprocation of the piston causes a flowing of the material under pressure and by its frictional engagement therewith circulates the material in its chamber so that the same portion of the material is not successively subject to the tendency to be drawn into the bore by the piston on its outward stroke.

Having thus described my invention, what I claim and desire to secure by Letters Patent of the United States is:

1. A device of the character described, comprising a casing having a chamber, a wall of said chamber having an aperture therethrough, a thrust member reciprocally fitting said aperture and extending into said chamber to provide an annular channel, a pliable cohesive material within said channel and encasing the end portion of said thrust member within said chamber and sealing said aperture, a tubular closed diaphragm of stretchable material having its end and side walls engaging said cohesive material, said casing having a fluid pressure port opening into said chamber on the opposite side of said diaphragm from said material for subjecting said diaphragm to pressure, and a screen member to keep said diaphragm spaced and away from movement into said port.

2. A device of the character described, compising a hollow casing, a diaphragm member of elastic material separating said casing internally to provide a pressure chamber, a complete peripheral edge portion of said diaphragm member being tightly secured in sealing engagement to said casing, and means within said casing and external of said chamber to subject said peripheral portion automatically and externally of said chamber to the pressure in said chamber such that the chamber pressure will be transmitted to and will tend to aid in holding said peripheral portion in sealing engagement with said casing.

3. A device of the character described, comprising a hollow casing, a diaphragm member of elastic material separating said casing internally and forming therewith a pressure chamber, a complete peripheral edge portion of said diaphragm member being vulcanized to said casing, and means to subject said peripheral portion automatically and externally of the chamber to the pressure in said chamber such that the chamber pressure will act and will tend to aid in holding said peripheral portion in sealing engagement with said casing.

4. A device of the character described, comprising a casing, a diaphragm of elastic material separating said casing internally into two compartments, one of said compartments being a pressure chamber, a thrust member reciprocally guided in a wall aperture of said casing and extending into the other of said compartments, and a pliable cohesive pressure transmitting material operable to move said thrust member and filling said other compartment and sealing said wall aperture, a marginal edge portion of said diaphragm being tightly secured in sealing engagement to said casing, said cohesive material having overlying contacting relation with said marginal diaphragm portion such that one surface of the diaphragm portion bears against the casing and so that said cohesive material bears against the other directly opposite surface of said portion in order that the pressure in said one compartment acting on said diaphragm will be transmitted through said diaphragm and by said cohesive material to the second named surface of said marginal portion thereby to hold said marginal portion in sealing engagement with said casing.

5. A device of the character described, comprising a hollow body member having an open side, a second body member closing said side, said body members being spaced to provide a channel, a diaphragm of elastic material having a marginal edge portion extending into said channel, said marginal portion being tightly secured in sealing engagement to said hollow member, a pliable cohesive material filling the space between said diaphragm and said second body member and extending into said channel in overlying contacting relation to said marginal portion, and a thrust member reciprocally guided in an aperture through said second body member and cooperatively engaging said cohesive material for movement thereby, said cohesive material acting by pressure on said diaphragm to move said thrust member and also acting to transmit the diaphragm pressure through the cohesive material in said channel and laterally against said marginal portion to hold said marginal portion in sealing engagement with said hollow body member.

6. A device of the character described, comprising a hollow casing, a flexible diaphragm separating said casing internally into two chambers, a piston extending into one of said chambers, a pliable cohesive material within said piston chamber and surrounding an end portion of said piston and operable to transmit pressure to move said piston, and means carried by said casing and supporting said piston for universal movement, said last-named means having a surface exposed to and having its joint with said casing closed and sealed by said cohesive material.

7. A device of the character described, comprising a hollow body member having a side opening, a closure member for said opening, a diaphragm carried by said closure member and defining therewith a pressure chamber, said body member having a wall aperture, a bushing universally supported in said aperture, a piston guided in said bushing and extending into said body member, and a pliable cohesive material filling the interior of said body member about said piston and operable to move said piston and sealing the joint between said bushing and said body member.

8. A device of the character described, comprising a hollow body member having an open side, a second body member closing said side and having an annular recess facing said hollow body member, an annular flange on said hollow body member cooperating with said recess to provide a channel, a diaphragm of elastic material having a marginal edge portion extending into said channel, said marginal portion being tightly secured in sealing engagement to said flange, a pliable cohesive material filling the space between said diaphragm and said second body member and extending into said channel in overlying contacting relation to said marginal portion, and a thrust member reciprocally guided in an aperture through said second body member and cooperatively engaging said cohesive material for movement thereby, said cohesive material acting by pressure on said diaphragm to move said thrust member and transmitting the diaphragm pressure laterally against said marginal portion to hold said marginal portion in sealing engagement with said flange.

9. A device of the character described, comprising a hollow body structure having an open side, a side of said structure having a wall with an aperture therethrough, a thrust member reciprocally fitting said aperture and extending into said body structure, a hollow cap member closing said open side and having an inward projecting portion, said cap member having a passageway opening into said body structure through said portion, a diaphragm member cupped over said projecting portion to define with said structure an internal chamber and having a marginal flange secured and sealed to said portion, said flange being spaced from said body structure to provide a channel, and a plastic material filling said chamber and said channel and surrounding said thrust member, said plastic material acting by pressure exerted on said diaphragm member to move said thrust member and to force said diaphragm member flange into tighter sealing engagement with said projecting portion.

10. A device of the character described, comprising a hollow body structure having an open side, the side of said structure opposite said open side having a wall with an aperture therethrough, a thrust member reciprocally fitting said aperture and extending into the interior of said body structure, a hollow cap member closing said open side and having an inward projecting portion, said cap member having a passageway opening into said body structure through said portion, a diaphragm member cupped over said projecting portion and having a marginal flange secured and sealed to said portion, said flange being spaced from said body structure to provide a channel, said projecting portion having an end recess communicating with and surrounding the inner end of said passageway, and means in said end recess to hold said diaphragm member away from said passageway, and a plastic material within said body structure and said channel and surrounding said thrust member, said plastic material acting by pressure exerted on said diaphragm member to move said thrust member and to force said diaphragm member flange into tighter sealing engagement with said projecting portion.

11. In a device of the character described, a casing having a flexible diaphragm member therein, an extension within and projecting from an inner wall of said casing, said diaphragm member having a portion cupped over and secured to said extension, and a force transmitting medium contacting said diaphragm member and confined therearound so that pressure on said diaphragm member on the opposite side thereof from said medium will act to force said medium against said diaphragm portion to seal said diaphram portion to said extension.

SERGIUS VERNET.